United States Patent
Yoo

Patent Number: 5,976,584
Date of Patent: *Nov. 2, 1999

[54] METHOD FOR PREPARING KIMCHI

[76] Inventor: Byong W. Yoo, 1929 Gomes Rd., Fremont, Calif. 94539

[*] Notice: This patent is subject to a terminal disclaimer.

[21] Appl. No.: 09/243,475

[22] Filed: Feb. 3, 1999

Related U.S. Application Data

[63] Continuation-in-part of application No. 08/966,162, Nov. 7, 1997, Pat. No. 5,869,116.

[51] Int. Cl.$^6$ .............. A23B 7/10; A23F 3/00; A23L 1/30; A23K 1/175

[52] U.S. Cl. .............. 426/49; 426/72; 426/74; 426/638

[58] Field of Search .............. 426/49, 72, 74, 426/638

[56] References Cited

U.S. PATENT DOCUMENTS

| | | | |
|---|---|---|---|
| 4,476,112 | 10/1984 | Aversano | 424/127 |
| 4,937,085 | 6/1990 | Cherry et al. | 426/269 |
| 5,084,293 | 1/1992 | Todd, Jr. | 426/541 |
| 5,258,179 | 11/1993 | Bracco et al. | 424/94.1 |
| 5,417,994 | 5/1995 | Chang et al. | 426/330.3 |
| 5,520,933 | 5/1996 | Yoshida et al. | 426/7 |
| 5,562,942 | 10/1996 | Koh et al. | 426/649 |

OTHER PUBLICATIONS

Cheigh, Hong–Sik, Korean's Life, "KIMCHI", Mil Al Co., 1995, pp. 194–195.

Lee, Sung Woo et al., Nutritional Food Chemistry, Su Hak Sa, pp. 260–261.

Seel, D.J. et al., "N–Nitroso Compounds in Two Nitrosated Food Products in Southwest Korea", FD Chem. Toxic, vol. 32, No. 12, pp.1117–1123, 1994.

Food Composition Table for use in East Asia, U.S. Department of Health, Education and Welfare, Dec. 1972, p. 37.

"The Most Popular Korean Dish: Kimchi" [Internet http://wwwakita–u.ac.jp].

Park et al., "Effect of Fermentation Temperature on the Physiocochemical Properties of Mustard Leaf (Brassica juncea) Kimchi During Various Storage Days", Journal of Korean Society of Food and Nutrition [Abstract only].

Principles of Food Chemistry discussion on Vitamin C and Vitamin E.

Composition of Foods: Vegetables and Vegetable Products, Raw Processed, Prepared, U.S. Department of Agriculture, Human Nutrition Information Service, Agriculture Handbook No. 8–11, 1982

*Primary Examiner*—Nina Bhat
*Attorney, Agent, or Firm*—Aquilino & Welsh

[57] ABSTRACT

A method for preparing kimchi is disclosed. The method includes the steps of preparing a mixture of vegetables and spices to be used in the preparation of kimchi, adding an effective dietary supplemental quantity of Vitamin C of at least approximately 0.1% to 2.4% by weight Vitamin C to the mixture of vegetables and spices prior to fermentation, and fermenting the mixture and the Vitamin C to produce kimchi exhibiting an increased Vitamin C content.

8 Claims, 1 Drawing Sheet

METHOD FOR PREPARING KIMCHI

RELATED APPLICATION INFORMATION

This application is a continuation-in-part of U.S. patent application Ser. No. 08/966,162, filed Nov. 7, 1997, now U.S. Pat. No. 5,869,116 entitled "Method for Preparing Kimchi".

BACKGROUND OF THE INVENTION

1. Field of the Invention

The present invention relates to a method for preparing kimchi (pickled vegetables) by fortifying it with Vitamin C.

2. Description of the Prior Art

Kimchi is possibly the most important side dish in the Korean diet. The Japanese also eat a version of kimchi called "kimuchi". While the specification refers to kimchi throughout, it should be understood that the use of this term is meant to include kimchi, kimuchi, and other variations of the traditional Korean pickled vegetable dish. Kimchi contains valuable phytochemicals-phytonutrients, and is well regarded by Koreans as an essential part of their diet.

Kimchi is a pickled product made from Chinese cabbage, Western cabbage, radishes, turnips, mustard greens, dandelions, cucumbers, carrots, beets, gingerroots, green onions, onions, garlic, fishes with salts. Depending on the temperature of the environment, the mixture is fermented anywhere from two days to a month.

Unfortunately, kimchi is also known to contain precursors for cancer causing compounds such as nitrites, nitrates, and secondary amines for the formation of nitrosamines. Further, kimchi is not a well-balanced food, since it is purely based upon plant sources.

Most Koreans believe that kimchi provides high levels of Vitamin C based upon its high vegetable content. However, the preparation and fermentation of the vegetables used in the manufacture of kimchi, substantially reduce the effective Vitamin C content of kimchi. The decrease in Vitamin C resulting from fermentation is unappreciated within the Korean community where most people believe that kimchi is very healthy and includes a high Vitamin C content.

This misconception is a result of the Vitamin C content found in the raw vegetables commonly employed in making kimchi. For example, Chinese cabbage includes 45 mg of Vitamin C, garlic includes 32 mg of Vitamin C, mustard includes 70 mg of Vitamin C, hot peppers include 242 mg of Vitamin C and oriental radishes include 22 mg of Vitamin C. Unfortunately, however, the preparation and fermentation processes utilized in making kimchi result in a drastic reduction in the Vitamin C content.

Specifically, and with reference to the articles entitled "Nutritional Food Chemistry" and "Korean's Life: Kimchi", the vegetables found in kimchi undergo a drastic reduction in Vitamin C content after fermenting. For example, the article entitled "Nutritional Food Chemistry" discloses that Chinese cabbage loses anywhere from 70–74% of its Vitamin C content upon fermentation. Similarly, oriental radishes lose anywhere from 53–56% of their Vitamin C content upon fermentation. This drastic reduction in Vitamin C content is not appreciated by the Korean community, as they believe kimchi includes substantial quantities of Vitamin C.

The lack of Vitamin C found in kimchi, when combined with the nitrates found in kimchi, may be a contributing factor to the high stomach cancer mortality rate found within the Korean population. It is widely believed that the nitrates within kimchi, as well as other carcinogenic components in the kimchi, when combined with the every day consumption found within the Korean community, contribute to high rates of stomach cancer. In fact, many Korean scientists advocate the consumption of kimchi as a health food without acknowledging the reduced Vitamin C content in the kimchi. This is propagated with the understanding that Vitamin C is a dietary useful antioxidant that may be helpful in countering the development of various forms of cancer.

As such, it is very important that traditional kimchi be modified to include a vitamin supplement as disclosed herein and not disclosed by the prior art. This present invention makes kimchi a more balanced, quality product by adding Vitamin C to reduce the risk of forming carcinogens.

SUMMARY OF THE INVENTION

It is, therefore, an object of the present invention to provide a method for preparing kimchi. The method includes the steps of preparing a mixture of vegetables and spices to be used in the preparation of kimchi, adding an effective dietary supplemental quantity of Vitamin C of at least approximately 0.1% to 2.4% by weight Vitamin C to the mixture of vegetables and spices prior to fermentation, and fermenting the mixture and the Vitamin C to produce kimchi exhibiting an increased Vitamin C content.

It is also an object of the present invention to provide a method for preparing kimchi wherein the vegetables are selected from the group consisting of Chinese cabbage, regular cabbage, radishes, cucumbers, mustard greens, dandelions, chicory, endive, perilla leaves, bell flower plant roots, leeks, chives, garland chrysanthemum, burdock, ginseng roots, kale, collard greens, lettuce, squash and broccoli.

It is another object of the present invention to provide a method for preparing kimchi wherein the spices are selected from group consisting of Japanese parsley, spring onions, garlic, onions, ginger root, hot pepper, salt and seafood sauces.

It is a further object of the present invention to provide a method for preparing kimchi wherein the Vitamin C is selected from the group consisting of ascorbic acid, calcium ascorbate, ester-C and sodium ascorbate.

It is also an object of the present invention to provide a method for preparing kimchi wherein organic acid is added to the mixture.

It is another object of the present invention to provide a method for preparing kimchi wherein the organic acid is selected from the group consisting of lactic acid, citric acid, and acetic acid.

The problems discussed above may be solved by preparing kimchi according to the present invention. This invention is a method of preparing kimchi by fortifying kimchi substrate with Vitamin C to reduce the risk of nitrates and nitrosocompound, as well as improving nutritional qualities of kimchi.

This method can be applied to other pickled products, salted seafood sauce, soybean and hot pepper bean paste, and cured meat products by fortifying with nutritional mineral salts.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
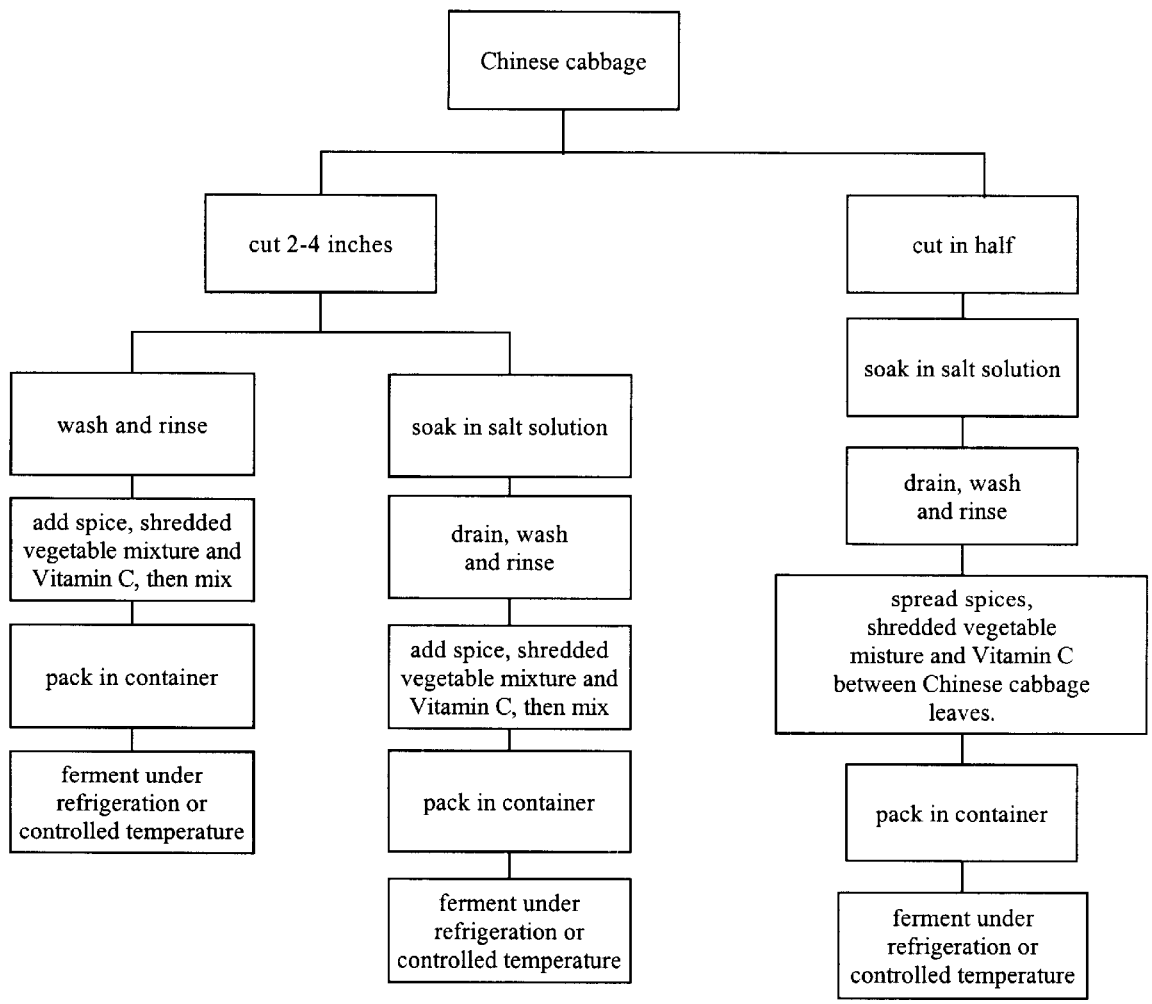
FIG. 1 is flow chart showing the process of making kimchi in accordance with the present invention.

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

The present invention is a method for preparing kimchi by fortifying it with Vitamin C. In accordance with the preferred embodiment of the present invention, kimchi is manufactured by first preparing a mixture of vegetables and spices used in the preparation of kimchi. An effective dietary supplemental quantity of Vitamin C is then added to the mixture of vegetables and spices.

Specifically, approximately 0.1% to 2.4%, or more, by weight Vitamin C is added to the mixture of vegetables and spices. Finally, the mixture of vegetables, spices and Vitamin C is fermented to produce kimchi exhibiting an increased Vitamin C content.

The vegetables used in accordance with the preferred embodiment of the present invention are selected from Chinese cabbage, regular cabbage, radishes, cucumbers, mustard greens, dandelions, chicory endives, perilla leaves, bell flower plant roots, leeks and chives, garland chrysanthemums, burdocks, ginseng roots, kales, collard greens, lettuce, squash and broccoli. In addition, the spices used in accordance with the preferred embodiment of the present invention are selected from Japanese parsley, spring onions, garlic, onions, ginger root, hot pepper, salt and seafood sauces.

With reference to FIG. 1, a flowchart disclosing the preferred method for preparing kimchi in accordance with the present invention is disclosed. As shown, Chinese cabbage may either be cut in 2–4" pieces or cut in half. When the cabbage is cut in 2–4" pieces, it may be processed in one of two manners. In accordance with a first method, the cabbage is first washed and rinsed. Spices, a shredded vegetable mixture and Vitamin C are then mixed with the cabbage. The mixture is then packed in a container and fermented under refrigeration or controlled temperature for a predetermined period of time.

In accordance with a second method, the cut cabbage is soaked in salt solution. The cabbage is then drained, washed and rinsed. Spices, a shredded vegetable mixture and Vitamin C are then mixed with the cabbage. The mixture is then packed in a container and fermented under refrigeration or control temperature for a predetermined period of time.

Where the Chinese cabbage is cut in half, the cabbage is first soaked in salt solution. The cabbage is then drained, washed and rinsed. Spices, a shredded vegetable mixture and Vitamin C are then spread between the Chinese cabbage leaves. The mixture is then packed in a container and fermented under refrigeration or control temperature for a predetermined period of time.

Kimchi (pickled vegetables) has been consumed for centuries in the Orient, and is second only to rice as the most important side dish in Korean families. However, mixtures of vegetables (Chinese cabbage, Oriental radish, etc.) for kimchi are found to contain a higher concentration of nitrates when compared with sauerkraut or pickled cucumbers.

The average Korean eats about 180 g (6 oz.) of vegetables in the form of kimchi each day. This amount is consumed almost daily for their entire life. As a result, it is considered that Koreans consume a higher quantity of nitrates and salts than other ethnic groups. In addition, Koreans are reported to have the highest incidence of stomach cancer. Since neither rice nor barley are carcinogens, speculation has led to a belief that kimchi may very well be responsible for the unusual incidence of stomach cancer in the Korean population. It is, therefore, an important concern of the present invention to reduce the possible risks of nitrates becoming cancer causing agents, such as nitrosamines and nitrosocompound, in the human metabolic system.

With this in mind, the present fortification of kimchi with Vitamin C is beneficial.

Kimchi and Health

The delicate flavor and taste of kimchi are thought to enhance the appetite and simultaneously supply the body with many micro-essential nutrients (phytochemicals-phytonutrients) and food fibers. For this reason, Koreans are known to have a reduced risk of breast, colon and prostate cancer. The reduced risk of these forms of cancer is believed to be the result of the consumption of kimchi and soy related products.

However, Koreans, and other pickled product consumers, are reported to have a higher incidence of stomach cancer, because pickled products contain higher concentrations of nitrates and salts. The U.S. Surgeon General's report on nutrition and health (1988) summarized that salt-pickled foods contain both nitrates and nitrites; these compounds can form carcinogenic nitrosamines in the mouth and stomach. Further reports state that there is a correlation between stomach cancer and pickled foods.

In 1994, Seel et al. reported that a few cities in South Korea contain different amounts of nitrate in their Kimchi; 1150 mg/kg in Chon Chu City, 1951 mg/kg in Chin An, and 2130 mg/kg in kimchi of North Cholla Province. With this mind, North Cholla Province reported that the incidence of stomach cancer made up 32% of all cancer patients between 1963–1990. Seel et al. only studied North Cholla province at that time. However, it is generally known that stomach cancer accounts for approximately 30% of all cancer cases in Korea. Researchers speculate that higher concentrations of nitrates in kimchi may be the cause of the higher occurrence of stomach cancer among Koreans.

About 70 years ago, stomach cancer accounted for approximately 10% of all cancer cases in the United States. However, increased consumption of foods containing Vitamin C year round (Weisbuger 1979), has reduced the incidence of stomach cancer to only 2% in 1990 (Passwater).

Vitamin C and Kimchi

A number of reports support the proposition that Vitamin C is beneficial in preventing the formation of nitrosamines, nitrosocompound and nitrosodimethylamine (NDMA). Vitamin C is selected from ascorbic acid, calcium ascorbate and/or sodium ascorbate.

Schmahal and Eisebrand (1982) report that N-nitroso compounds occur environmentally in products and are also generated in vivo from their precursors. In the presence of ascorbic acid (Vitamin C), the formation of nitrosocompound is blocked. NDMA (nitrosodimethylamine) formation in saliva was inhibited up to 90% with ascorbic acid (Rao et al. 1982). In the presence of ascorbic acid, formation of NDMA from nitrate in the stomach of dogs was depressed greatly (Lintas et al. 1982).

In addition, Vitamin C is effective in blocking the formation of nitrosamines in the gastrointestinal tract. When researchers gave 2,000 mg of Vitamin C and 400 I.U. of Vitamin E to 10 college students on a daily basis, they discovered that the ascorbic acid and Vitamin E blocked 95% nitrosamines formation (Wagner et al., 1985). Birt (1986) emphasized that the prevention of cancer is achieved through the inhibitory effect of ascorbic acid by stopping the formation of nitrosamines and nitrosocompound. Large doses of Vitamin C can reduce the incidence of hepatitis following surgeries that require blood transfusions. The Japanese reported a fall in the incidence of post-transfusion hepatitis from 7% in a control group of 150 patients to 0% in the group of 1100 patients administered with 2,000 mg of ascorbic acid daily (Murata 1975).

During soy sauce fermentation, the NDMA content was positively correlated with increased nitrate concentration. Nitrate at 400 mg/L resulted in an NDMA content of 203 μg/L. With the addition of ascorbic acid the formation of NDMA was substantially inhibited from 203 μg/L to 4.4 μg/L (a 98% reduction) (Sung et al. 1991).

Bland (1995) reports that the formation of nitrosamines, nitrates, and nitrites requires the combination of amines which are obtained in the protein of normal diets with the aid of an acidic environment like the stomach. Vitamin C prevents nitrosamines formation by combining with the nitrates and nitrites, and rendering them harmless.

Vitamin C is an essential nutrient in the prevention and cure of many diseases such as cancer, blood pressure, cholesterol, gastritis, hepatitis and colds (Goodman 1991).

As discussed above, Vitamin C content in vegetables is reduced during fermentation of pickled vegetables, such as kimchi, and the finished product contains far less Vitamin C than that of fresh vegetables (Seel et al.).

As such, and in accordance with the present invention, kimchi is fortified with the addition of Vitamin C. The additional Vitamin C provided in Vitamin C fortified kimchi acts as a standing army to prevent the formation of undesirable compounds such as nitrosamines, NDMA, and other nitrosocompound which may be carcinogenic.

For Koreans who consume large amounts of kimchi on a daily basis, Vitamin C fortified kimchi may provide many benefits such as lowering the harmful effects of nitrate, lowering blood pressure and many other health benefits.

Salt and Kimchi

Kimchi contains about 2.75% (1.5–4%) salt and sauerkraut contains an average of 2.25% salt in relation to the weight of cabbage (Luh B. S. and Woodroof S. G. 1975 Commercial Vegetable Processing AVI Publishing Co.).

Koreans consume salt in much greater quantities than needed. Those that consume more salty soy paste and hot pepper bean paste have an increased occurrence of stomach cancer (Lee J. K. et al. 1995).

Salt cured foods have been linked to gastric cancer (U.S. Surgeon General Report 1988). Americans consume ten times the sodium than their predecessors. An ideal ratio of sodium to potassium intake would be 1 to 4, but actually occurs in the reverse ration of 4 to 1. High sodium diets increase both cancer incidence and metastasis (Quillin P. 1994). Reduction of salt consumption reduces the incidence of stomach cancer and stroke (Tuomilethto 1984).

Acidity of Kimchi

To compare the formation of acid during kimchi fermentation, a standard lactic acid concentration and pH were established by making various concentrations of lactic acid to fresh chopped raw kimchi (see Table 1).

The general acidity of kimchi for pleasant tasting kimchi is between a pH of 4.2–3.5 (acid concentration 0.3%–0.7% as lactic acid).

Organic Acid Concentration and pH Reading in Kimchi

To compare acid formation during kimchi fermentation, various amounts of lactic acid were added into fresh, raw kimchi which was chopped and blended. The pH was measured and was used as the reference pH and acid concentration. Lactic acid, citric acid, malic acid and acetic acid are used alone or together as organic acids.

During active fermentation more than 200,000,000 microbes are present per mL in kimchi liquid. However, these microbes are reduced by an increased amount of lactic acid in the substrates within a few days of fermentation.

| Amount of Lactic Acid (%) | pH |
| --- | --- |
| 0 | 5.8 |
| 0.05 | 5.5 |
| 0.1 | 4.8 |
| 0.2 | 4.5 |
| 0.3 | 4.2 |
| 0.4 | 4.0 |
| 0.5 | 3.8 |
| 0.7 | 3.5 |
| 0.9 | 3.3 |
| 1.1 | 3.2 |
| 1.3 | 3.2 |

A better understanding of the present invention may be obtained in light of the following examples, which are set forth to illustrate, but are not to be construed to limit the present invention.

COMPARATIVE EXAMPLE I

The Preparation of Standard Kimchi

This example includes no addition of Vitamin C (ascorbic acid, calcium ascorbate, or sodium ascorbate), vegetables (Chinese cabbage 70; oriental radish 30), and 2.5% salt added to weight of vegetables. Vegetables (sliced 1" thick), spices, salt and water were mixed and were immersed in a glass bottle. PH was measured from the kimchi liquid in intervals over a duration of the 0.5 and 60 hour period. PH changes of this standard kimchi recipe are used to analyze the fermentation rate of kimchi. PH is 5.8 at the 0.5 hr. mark, 5.5 at the 24 hr. mark, 4.1 at the 36 hr. mark, and 3.5 at the 48 hr. mark and 60 hr. mark. After 48 hours, over 0.5% of lactic acid was formed in kimchi (pH 3.5).

TABLE 1

| Kimchi Ingredient | Quantity (grams) |
| --- | --- |
| Chines cabbage | 1000 |
| Garlic powder | 5 |
| Onion powder | 5 |
| Hot pepper powder | 10 |
| Salt | 25 |
| Calcium ascorbate | 10 |

EXAMPLE 1

To a standard sample, 1% ascorbic acid, and 0.5% calcium ascorbate were added. PH was 3.5 at the 0.5 hr. interval and kept under refrigeration.

EXAMPLE 2

To a standard sample, 20% of salt was replaced with other salts (magnesium chloride, calcium chloride and potassium chloride) and 0.5% of ascorbic acid was added to the weight of vegetables (as a result of the lower amount of ascorbic acid in comparison with Example 1). PH was shown as 3.8 at 0.5 hours and 4.8 after 24 hours and 36 hours. These results may indicate that the ascorbic acid was absorbed into the vegetable's texture, the acid concentration was equilibrated, and the acidity was not strong enough to inhibit fermentation. PH was shown at 3.5 after 48 hours and 60 hours, this shows that fermentation had taken place and produced the acidity.

Tartaric taste was noticed but at an acceptable level.

EXAMPLE 3

To a standard sample, 1% of calcium ascorbate, which is non-acidic Vitamin C, was added. The rate of fermentation was similar to the standard and the total acid was somewhat lower than standard after 48 and 60 hours of fermentation. PH changed from 5.8 at the 0.5 hour mark to 3.8 at the 60 hour mark. This example will enable a person to take 1000 mg (1 g) of Vitamin C when 100 g of kimchi is consumed.

EXAMPLE 4

To a standard sample, 20% of table salt was replaced with potassium chloride, magnesium chloride, and calcium chloride; 0.4% ascorbic acid; 0.5% sodium ascorbate; and 4 organic acids (lactic acid, citric acid, malic acid and vinegar were added). Due to ascorbic acid and organic acids (totaling over 0.8% in comparison with the weight of cabbage), pH was shown to be 3.35 at the 0.5 hour mark and 3.5 at the 12 hour and 24 hour mark. This example resulted in an instant type of kimchi where the taste was acceptable.

EXAMPLE 5

To a standard sample, 1% of ascorbic acid was added and kept for 72 hours at room temperature. PH was 3.2 after the first 0.5 hour and stayed consistent at 3.8 from 24 to 72 hours; this indicates that fermentation had not taken place due to the high initial concentration of acidity present in ascorbic acid. The product is an instant kimchi or kimchi salad where the taste was acceptable with a mild, bitter taste.

EXAMPLE 6

Instead of Chinese cabbage, western cabbage was used as the kimchi vegetable; 1% of calcium ascorbate was added; and 20% of table salt was replaced with potassium chloride, magnesium chloride, and calcium chloride. Even though cabbage was cut into smaller pieces than Chinese cabbage, kimchi liquid was not released, so it was not sufficient to cover the mixture; therefore, water was added (15% to cabbage weight). Fermentation rate was somewhat slower than standard; it may be due to presence of heavier texture. The quality of the product was appealing because of its crispiness and chewiness.

TABLE 2

| Raw Materials for Kimchi (q) | Example 5 | Example 6 | Example 7 |
| --- | --- | --- | --- |
| Chinese cabbage | 400 | 400 | 0 |
| Cabbage | 0 | 0 | 400 |
| Garlic powder | 2 | 2 | 2 |
| Onion powder | 2 | 2 | 2 |
| Hot pepper powder | 4 | 4 | 4 |
| Salt (NaCl) | 8 | 10 | 8 |
| KCl | 0.7 | | 0.7 |
| MgCl$_2$ | 0.7 | | 0.7 |
| CaCl$_2$ | 0.7 | | 0.7 |
| Ascorbic acid | 1.6 | 4 | |
| Sodium ascorbate | 2 | | |
| Calcium ascorbate | | | |
| Lactic acid | 0.8 | | |
| Citric acid | 0.4 | | |
| Malic acid | 0.4 | | |
| Vinegar | 1.5 | | |

TABLE 2-continued

| Raw Materials for Kimchi (q) | Example 5 | Example 6 | Example 7 |
| --- | --- | --- | --- |
| Vitamin E | | | |
| Water | | | 60 |

TABLE 3

PH changes during fermentation

| Time | Example 59 | Example 6 | Example 7 |
| --- | --- | --- | --- |
| 30 minutes | 3.35 | 3.2 | 5.8 |
| 12 hours | 3.5 | 3.5 | 5.8 |
| 24 hours | 3.5 | 3.8 | 5.8 |
| 36 hours | Put into refrigerator | 3.8 | 4.4 |
| 48 hours | | 3.8 | 3.8 |
| 60 hours | | 3.8 | 3.8 |
| 72 hours | | 3.8 | 3.8 | temperature 22–24 degrees Celsius

SUMMARY

1. Acidic Vitamin C ascorbic acid (0.5–1% to kimchi substrate weight), can produce an instant type kimchi and inhibit the fermentation found in tradition kimchi making.

2. Non-acidic Vitamin C, calcium ascorbate or sodium ascorbate, can be added to kimchi 2% without inhibiting fermentation. Taste was acceptable.

3. Table salt (NaCl) can be replaced with other nutritional salts as potassium chloride, magnesium chloride and calcium chloride up to 20%.

4. For instant kimchi, ascorbic acid can be added alone or along with other organic acids like lactic acid, citric acid, malic acid and vinegar.

5. Western cabbage produced a kimchi with better texture (crispier). In addition to the substitution of Chinese cabbage with western cabbage, 1% Vitamin C was added. Therefore, Vitamin C can be added into cole slaw, sauerkraut and pickles.

6. Addition of 2% Vitamin C to kimchi will cause the average Korean who consumes 180 g (6 ounces) of kimchi per day, to consume 3600 mg (3.6 g) of Vitamin C. This amount will result in an intake that is 60 times the amount recommended by the RDA.

7. Vitamin A was tried, but the taste of the kimchi was not pleasing.

Benefits of This Invention

For Koreans who consume large quantities of kimchi daily, throughout their life, kimchi enhanced with Vitamin C will harbor many benefits. These benefits include lowering cholesterol, lowering blood pressure, reducing the risk of stroke, increasing immune response, and perhaps the lowering of the risk of stomach cancer from nitrates.

Raw kimchi, without curing (fermentation), has a very raw vegetable smell and taste. It has an imbalanced acidic taste. By adding Vitamin C (ascorbic acid) to kimchi, or kimchi spice mix, the kimchi produces more juice and develops a delicate acidic taste resembling fermented kimchi. The pH of the kimchi juice in raw kimchi is 5.5 and the pH of the kimchi juice in kimchi with the addition of ascorbic acid (0.5%) is 3.5.

In addition, fortifying kimchi with Vitamin C speeds the preparation time required for kimchi. It generally takes 2–3 days at room temperature, and over 3 days under refrigeration, to cure kimchi for consumption. With the addition of Vitamin C, kimchi preparation time can be shortened tremendously and can be eaten as soon as the preparation is complete.

Vitamin C also improves the long term storage ability of kimchi. As the storage time for kimchi increases, there is a slow development of an undesirable smell and odor during a 37 day refrigeration period. Regular kimchi has an acceptable taste and smell for about 18 days, but the quality deteriorates when kimchi is stored longer. It has been found that kimchi with 0.5% ascorbic acid did not develop any undesirable smell or taste after 37 days. The pH of the regular kimchi was 5.5 (initially), 4.1 (on the $18^{th}$ day), and 4.1 on the ($37^{th}$ day). The pH of the kimchi with 0.5% Vitamin C was 3.5 (initially), 4.2 (on the $18^{th}$ day), and 4.2 (on the $37^{th}$ day). The regular kimchi developed microorganisms which produced acid and thus lowered the pH from 5.5 to 4.1 during refrigerated storage. The kimchi with Vitamin C reduced the growth of microorganisms needed for fermentation and simultaneously prevented further spoiling of the product.

Further, kimchi becomes safer with the addition of Vitamin C. Vegetables have a lower acidity than fruit. In order to improve the eating quality (taste), most salads are served with dressing containing a substantial amount of vinegar which controls the growth of microorganisms. In Korea, it is generally known that fermented kimchi is safe to eat, whereas fresh kimchi is not. The raw materials for kimchi (Chinese cabbage, radishes, spring onions, mustard, etc.) contain a lot of soil born and water-borne microorganisms (bacterium and parasites are found in swamp cabbage and Japanese parsley produced from moist areas). The addition of Vitamin C to regular kimchi resulted in bacterial numbers lower than normal. During one trial, a sample Standard Plate Count (SPC) was measured at 7 days. The bacterial count shows that regular kimchi had 380,999/g and kimchi with Vitamin C (0.5%) had 200,000/g (52% of regular). Coliform growth showed 1,100+ for regular kimchi and only 240 for kimchi with Vitamin C (22%) of regular. After 14 days, lactic bacterial showed a growth of 4,100,000 for regular kimchi and only 310,000 for kimchi with Vitamin C (7.6%). See Table 4.

TABLE 4

Kimchi Sample Under Refrigeration (40° F.)

Test A (after 7 days)

|  | SPC/g | Coliform/g |
| --- | --- | --- |
| Control | 380,000 | <1,100 |
| Control W/ Vitamin C | 200,000 | 240 |

Test B (after 26 days)

|  | SPC/g | Coliform/g |
| --- | --- | --- |
| Control | 1,200,000 | 1,100 |
| Control w/ Vitamin C | 360,000 | 150 |

Test C (after 14 days)

|  | Lactobacillus organisms/g |
| --- | --- |
| Control | 4,100,000 |
| Control w/Vitamin C | 310,000 |

Test D (after 33 days)

|  | Lactobacillus organisms/g |
| --- | --- |
| Control | 2,600,000 |
| Control W/Vitamin C | 370,000 |

With reference to Table 4, samples from Test A and Test C are from the same batch and samples from Test B and Test D are from the same batch. These samples were analyzed on different dates. The control kimchi was market purchased and 0.5% ascorbic acid was added to the weight of the kimchi.

In summary, Koreans are known to have the highest incidence of stomach and liver cancer in the world. This may be due to their high consumption of kimchi which lacks Vitamin C and has high concentration of nitrates, salts, and hot peppers. In addition, most Koreans are infected with helicobacter pylori (90% of the population of those over age 20). Nitrates, salts, hot peppers and helicobacter pylori are known to cause stomach cancer. Hot peppers are also known to cause liver cancer. When there is a lack of adequate amounts of Vitamin C in the stomach, nitrates are converted to nitrosamines or nitrosocompounds. These are cancer causing compounds.

Nitrates are not harmful in fresh vegetables which contain a moderate amount of Vitamin C (for example 45 mg of Vitamin C/100 g of cabbage and Chinese cabbage). Kimchi contains only about 15 mg of Vitamin C, because the Vitamin C amount is reduced during the preparation and fermentation of kimchi. Consumers of such pickled vegetables are reported to have a higher percentage of stomach cancer. For example, Koreans, Japanese and Chinese.

The addition of Vitamin C to kimchi will be beneficial and supplement the lack of Vitamin C found in the average Korean's diet. With the addition of Vitamin C to kimchi, the occurrence of stomach cancer will likely decrease within the Korean community.

While various preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. A method for preparing kimchi comprising the steps of:

preparing a mixture of vegetables and spices to be used in the preparation of kimchi;

adding an effective dietary supplemental quantity of Vitamin C of at least approximately 0.1% to 2.4% by weight Vitamin C to the mixture of vegetables and spices prior to fermentation; and fermenting the mixture and the Vitamin C to produce kimchi exhibiting an increased Vitamin C content.

2. The method in accordance with claim 1, wherein the vegetables are selected from the group consisting of Chinese cabbage, regular cabbage, radishes, cucumbers, mustard greens, dandelions, chicory, endive, perilla leaves, bell flower plant roots, leeks, chives, garland chrysanthemum, burdock, ginseng roots, kale, collard greens, lettuce, squash and broccoli.

3. The method in accordance with claim 1, wherein the spices are selected from group consisting of Japanese parsley, spring onions, garlic, onions, ginger root, hot pepper, salt and seafood sauces.

4. The method in accordance with claim 1, wherein the Vitamin C is selected from the group consisting of ascorbic acid, calcium ascorbate, ester-C and sodium ascorbate.

5. The method in accordance with claim 4, wherein the vegetables are selected from the group consisting of Chinese cabbage, regular cabbage, radishes, cucumbers, mustard greens, dandelions, chicory, endive, perilla leaves, bell flower plant roots, leeks, chives, garland chrysanthemum, burdock, ginseng roots, kale, collard greens, lettuce, squash and broccoli.

6. The method in accordance with claim 4, wherein the spices are selected from group consisting of Japanese parsley, spring onions, garlic, onions, ginger root, hot pepper, salt and seafood sauces.

7. The method in accordance with claim 1, wherein organic acid is added to the mixture.

8. The method in accordance with claim 7, wherein the organic acid is selected from the group consisting of lactic acid, citric acid, and acetic acid.

* * * * *